B. T. LANE.
WEEDER FOR HARROWS.
APPLICATION FILED JULY 22, 1913.
1,107,173.
Patented Aug. 11, 1914.
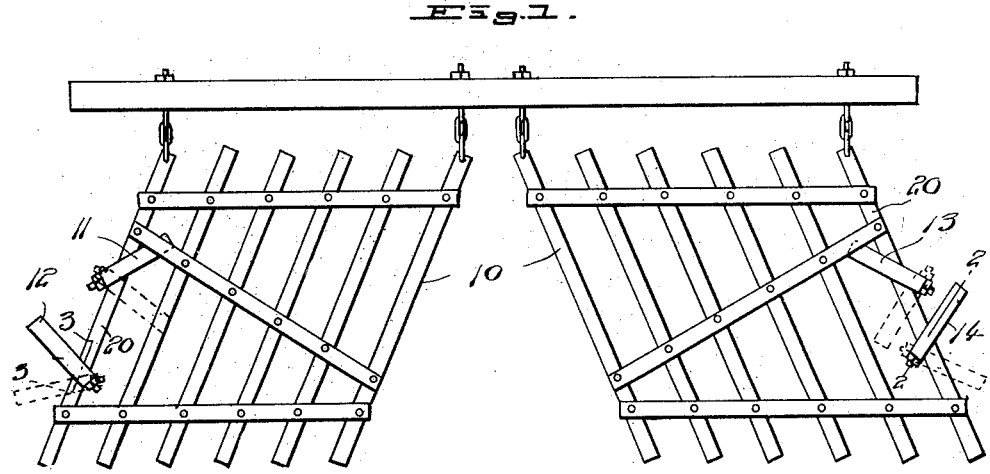
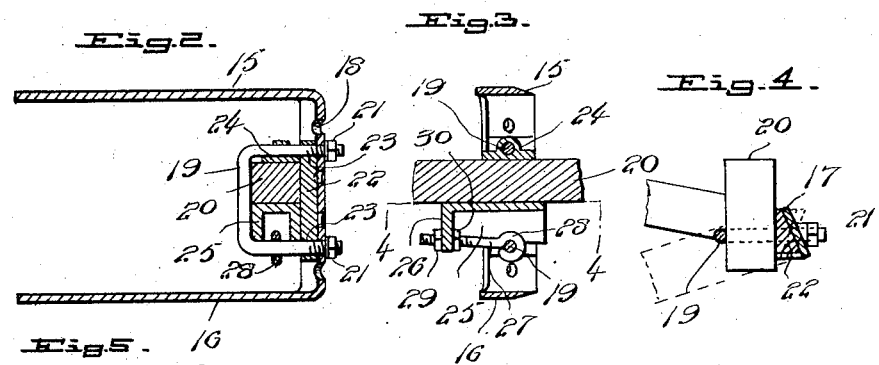
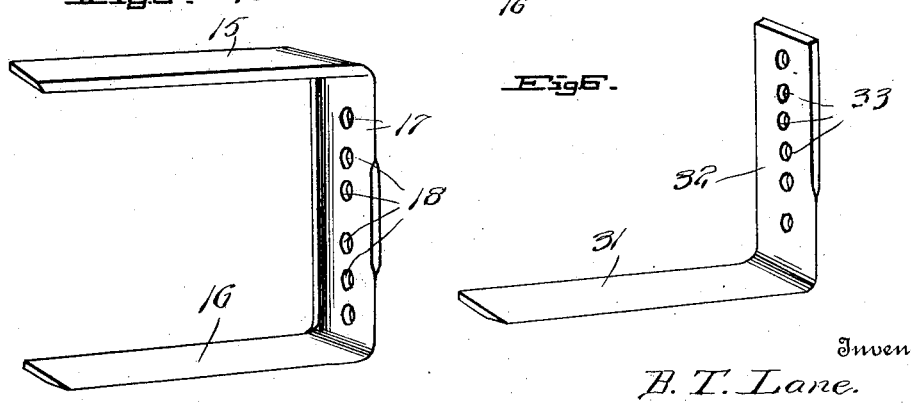
Inventor
B. T. Lane.
Witnesses
By
Attorney

UNITED STATES PATENT OFFICE.

BENJAMIN T. LANE, OF BAIRD, WASHINGTON.

WEEDER FOR HARROWS.

1,107,173. Specification of Letters Patent. Patented Aug. 11, 1914.

Application filed July 22, 1913. Serial No. 780,534.

*To all whom it may concern:*

Be it known that I, BENJAMIN T. LANE, a citizen of the United States, residing at Baird, in the county of Douglas, State of Washington, have invented certain new and useful Improvements in Weeders for Harrows; and I do declare the following to be a full, clear, and exact description of the invention, such as will enable others skilled in the art to which it appertains to make and use the same.

This invention relates to weed cutters and has for an object to provide a device of this character in the nature of a blade and securing means for attaching the same at various desired angular positions upon a harrow.

A further object of the invention is to provide a device of this character in which the parts will be reversible to effect the desired angular adjustment of the blade.

A still further object is to provide an extremely simple and inexpensive device of this character which will be formed of a few strong and durable parts that will not easily get out of order.

With the above objects in view the invention consists of certain novel details of construction and combination of parts hereinafter fully described and claimed, it being understood that various modifications may be made in the minor details of construction within the scope of the appended claims.

In the accompanying drawing illustrating this invention:—Figure 1 is a plan view of a harrow showing weed cutters embodying my improvements attached at various angular positions upon the harrow. Fig. 2 is a cross sectional view on the line 2—2 Fig. 1 showing the blade attaching means. Fig. 3 is a vertical sectional view on the line 3—3 Fig. 1. Fig. 4 is a cross sectional view on the line 4—4 Fig. 3. Fig. 5 is a detail perspective view of one form of blade. Fig. 6 is a detail perspective view of a modified form.

Referring now to the drawing in which like characters of reference designate similar parts, 10 designates an ordinary harrow of the two section type as shown.

At 11, 12, 13 and 14 are shown weed cutters embodying my improvements, each being shown in full lines in one angular adjusted position, and in dotted lines in another adjusted position. As illustrated the blades are all shown attached to the outer frame bars of the harrow sections, but it is to be understood that the blades may be attached at any desired location on the sections, and further that any number of the blades may be employed that will most advantageously adapt the device to the work which it may be called upon to perform.

In carrying out my invention, I provide a reversible blade including two knives 15 and 16 connected by a shank 17 that is provided with a series of openings 18 to receive the ends of a U-bolt 19 that is adapted to straddle the frame bar 20 of the harrow, there being nuts 21 on the ends of the U-bolt to secure the parts together. An upright wedge 22 is provided with openings 23 to receive the legs of the U-bolt, this wedge being inserted between the shank of the blade and the frame bar and being adapted to be reversed to position the knives at any desired angular location relatively to the frame bar as illustrated in Fig. 1. An abutment plate 24 is provided with an eye to receive one leg of the U-bolt, this abutment plate bearing upon one face of the bar. A channeled wedge 25 is disposed to bear upon the opposite face of the bar from the abutment plate and is provided with an orifice lip 26 through which an eye bolt 27 is passed, the eye of the bolt encircling the opposite leg of the U-bolt from the abutment plate as shown at 28, and there being nuts 29 and 30 threaded on to the eye bolt and bearing against opposite sides of the lip to anchor the channeled wedge stationary. The eye bolt extends within the channel of the channeled wedge whereby by unloosening the nut 29 and tightening the nut 30 the wedge will be moved outwardly whereby its thickened end wedges tightly between the corresponding face of the frame bar and adjacent leg of the U-bolt and positively anchors the blade in place.

In Fig. 6 is shown a modified form of blade which includes a knife 31 and a shank 32 provided with a series of orifices 33 for receiving the legs of the above described U-bolt.

By reversing the position of the various parts comprising the above described device and its attachment, the knives may be disposed inside or outside of the related frame bar and disposed at a forward or at a rearward angle thereto as desired in order to accommodate the device to operate most effectively under various conditions of service.

From the above description it will be seen that I have provided an extremely simple and inexpensive device of the character described which is formed of a few strong and durable parts that are readily assembled and disassembled and will not easily get out of order.

What is claimed, is:—

1. A weed cutting attachment for harrows including a knife having a shank provided with a series of orifices, a U-bolt adapted to encircle a bar of the harrow and having the legs passed through said orifices, nuts on said legs, an abutment plate on one leg of said U-bolt adapted to bear against one face of said bar, a wedge slidably mounted on the other leg of said U-bolt, means for moving said wedge longitudinally through said U-bolt whereby to wedge said beam securely against said abutment plate, and a reversible wedge having openings receiving the legs of said U-bolt, said reversible wedge being disposed between the inner face of said shank and said abutment plate and said channeled wedge.

2. A weed cutter including a knife having a right-angularly disposed shank provided with a series of openings, a U-bolt having the legs passed through said openings, nuts on said U-bolt, an abutment plate on one leg of said U-bolt, a channeled wedge bearing with its inclined edge upon the inner face of the opposite leg of the U-bolt, an eye bolt engaging the last named leg of said U-bolt and bearing within the channel of said wedge, a lip on said wedge receiving the threaded end of said eye bolt, nuts on said eye bolt bearing against opposite sides of said lip, and a wedge having openings receiving the legs of said U-bolt and disposed between the inner face of said shank and said abutment plate and said channeled wedge.

In testimony whereof, I affix my signature, in the presence of two witnesses.

BENJAMIN T. LANE.

Witnesses:
J. T. CULL,
A. McDONALD.

Copies of this patent may be obtained for five cents each, by addressing the "Commissioner of Patents, Washington, D. C."